United States Patent
Jang et al.

(10) Patent No.: US 8,780,865 B2
(45) Date of Patent: *Jul. 15, 2014

(54) METHOD AND SYSTEM FOR DETERMINING ACCESS DURING INTER-TECHNOLOGIES HANDOFF

(75) Inventors: Ke-Chi Jang, Plano, TX (US); Jun Li, Richardson, TX (US); Larry T. Bolen, McKinney, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,612

(22) Filed: Sep. 14, 2012

(65) Prior Publication Data

US 2013/0065590 A1 Mar. 14, 2013

Related U.S. Application Data

(63) Continuation of application No. 12/670,476, filed as application No. PCT/US2008/072293 on Aug. 6, 2008.

(60) Provisional application No. 60/954,527, filed on Aug. 7, 2007.

(51) Int. Cl.
*H04W 4/00* (2009.01)
*H04W 36/00* (2009.01)

(52) U.S. Cl.
USPC ........ 370/331; 370/230; 370/310.2; 370/318; 455/439; 455/442; 455/444; 455/13.4; 455/522; 340/7.36

(58) Field of Classification Search
USPC .............. 370/230, 235, 310.2, 328, 331, 332, 370/447, 461, 462, 318; 455/432.1, 434, 455/436, 439–444, 13.4, 522, 127.5, 270, 455/345.5; 340/7.32, 7.36, 7.37, 425.2
See application file for complete search history.

(56) References Cited

U.S. PATENT DOCUMENTS

| 5,940,743 A * | 8/1999 | Sunay et al. ................... 455/69 |
| 7,010,319 B2 * | 3/2006 | Hunzinger ................... 455/522 |

(Continued)

FOREIGN PATENT DOCUMENTS

| JP | 2001-511986 | 8/2001 |
| JP | 2006-512867 | 4/2006 |

(Continued)

OTHER PUBLICATIONS

Office Action issued in Japanese Application No. 2010-520271 on Dec. 12, 2012; 5 pages.

(Continued)

*Primary Examiner* — Benjamin H Elliott, IV
(74) *Attorney, Agent, or Firm* — Fish & Richardson P.C.

(57) ABSTRACT

A system and method for determining an initial mean open loop power level of a pilot channel of a reverse traffic channel for a mobile terminal. The initial open loop power level enables handoff of an active call from a first access network to a second access network. A handoff initialization request is from the first access network. A mean received power level of the forward link of the second access network is measured and transmitted to the second access network. An open loop power adjustment factor is received from the second access network. The initial mean open loop power level is set based on the open loop power adjustment factor.

20 Claims, 3 Drawing Sheets

(56) References Cited

U.S. PATENT DOCUMENTS

| | | | |
|---|---|---|---|
| 7,039,410 B2 | 5/2006 | Jovanovic | |
| 7,983,708 B2 | 7/2011 | Mehrabanzad et al. | |
| 8,054,802 B2 * | 11/2011 | Burgess et al. | 370/331 |
| 2003/0050084 A1 | 3/2003 | Damnjanovic et al. | |
| 2006/0246903 A1 | 11/2006 | Kong et al. | |
| 2007/0160049 A1 * | 7/2007 | Xie et al. | 370/390 |
| 2007/0217397 A1 * | 9/2007 | Cui et al. | 370/352 |
| 2008/0108367 A1 * | 5/2008 | Afrashteh et al. | 455/452.2 |
| 2010/0226267 A1 | 9/2010 | Jang et al. | |

FOREIGN PATENT DOCUMENTS

| | | |
|---|---|---|
| JP | 2007-531454 | 11/2007 |
| WO | 2008/096407 | 8/2008 |

OTHER PUBLICATIONS

Office Action issued in Chinese Application No. 200880107438.2 on Jun. 13, 2012; 11 pages.

International Search Report and Written Opinion of the International Searching Authority issued in International Application No. PCT/US2008/072293 on Oct. 22, 2008; 8 pages.

International Preliminary Report on Patentability issued in International Application No. PCT/US2008/072293 on Feb. 9, 2010; 6 pages.

Office Action issued in U.S. Appl. No. 12/670,476 on Aug. 14, 2012; 25 pages.

Office Action issued in Chinese Application No. 200880107438.2 on Mar. 8, 2013; 12 pages.

* cited by examiner

METHOD AND SYSTEM FOR DETERMINING ACCESS DURING INTER-TECHNOLOGIES HANDOFF

CROSS-REFERENCE TO RELATED APPLICATIONS

This application is a continuation of U.S. application Ser. No. 12/670,476, filed on Jan. 25, 2010, which is a National Stage Entry of PCT/US2008/072293, filed on Aug. 6, 2008, which claims priority to U.S. Provisional Application No. 60/954,527, filed on Aug. 7, 2007, the entire contents of each are hereby incorporated by reference.

FIELD OF THE INVENTION

The present invention relates generally to cellular communication systems and more specifically to a method and system for determining an initial mean output power for a pilot channel of the reverse traffic channel when handing-off an active call between networks that use different access technologies.

BACKGROUND OF THE INVENTION

Wireless technologies are evolving toward broadband information access across multiple networking platforms to meet demand for continuous availability of multimedia applications. Recent trends indicate that wide-area cellular networks based on second, third and fourth generation ("2G", "3G" and "4G") standards and wireless local area networks ("WLANs") will co-exist to offer multimedia services to end users. Seamless mobility across the multiple networking platforms is needed to enhance interoperability and service continuity among the various wireless networks.

Mobility management provides universal wireless coverage and broadband access by strategically combining multiple networking platforms. During mobility management, the system may perform both intra-technology handoffs and inter-technology handoffs. Intra-technology handoffs include the traditional horizontal handoff process in which the mobile terminal hands-off between evolved Node-B ("eNB"), access points ("AP") or base stations ("BS") using the same access technology. Alternatively, inter-technology handoffs, commonly referred to as vertical handoffs ("VHO"), are performed when the mobile terminals roam between different access technologies.

VHO may include moving out of a preferred network ("MOUT") or moving into a preferred network ("MIN"). For example, handoff procedures may be initiated when signal strength measurements originating in the primary network fall below pre-selected threshold parameters. The mobile terminal may detect the weak signal strength emanating from the primary network and may initiate a handoff to the secondary network having strong signal strength by reporting the weak signal to the primary network.

Frequently, during communication handoffs between access networks using different technologies, mobile terminals experience loss of service or service interruptions while negotiating the handoff exchange between the wireless access networks. One of the problems experienced during a handoff is that the mobile terminal does not know the appropriate open loop power needed to continue the call using the new network.

For any given access network, the direction of data flow is indicated by the terms "Forward Channel" (also known as "Forward Link) and "Reverse Channel" ("Reverse Link").

The Forward Channel contains communications travelling from the access network to the mobile terminal. The Reverse Channel includes communications travelling from the mobile terminal to the access network. The forward channel typically includes the Pilot Channel, MAC Channel, Control/Traffic Preamble, and Control/Traffic Channel. The Reverse Channel typically includes the Access Channel ("ACH") and the Reverse Traffic Channel ("RTC") depending upon the state of the data connection. The Access Channel is used by the mobile terminal to initiate communication with the access network. The mobile terminal uses the Reverse Traffic Channel to transmit user-specific data or signaling information to the access network.

Generally, when a mobile terminal originally places a call, it sends an access probe to the network on the access channel. The probe includes a call request. The mobile terminal gradually increases the power level until the call request is successfully completed. Then, the mobile terminal uses the power level established by the access probe to transmit the content of the call on the traffic channel. When the mobile terminal places subsequent calls, it retrieves the last successful power level from memory and uses this power level from the previous access probe as a starting point for the initial power estimation for a new access probe.

For example, for an Evolution-Data Optimized ("1×EV-DO") network, also known as High Rate Packet Data ("HRPD"), the mobile terminal estimates the open loop power needed using the following method. When the mobile channel initiates a reverse traffic channel transmission (i.e., from the mobile terminal to the base station), the initial mean output power of the pilot channel of the RTC is set as the mean output power of the pilot channel at the end of the last access channel ("ACH") probe minus the difference in the forward link ("FL") mean received signal power from the end of the last ACH probe to the start of the RTC transmission. Thus, the initial mean power is based on the output power of the last successful access probe.

Use of the access probe is not desirable when the mobile terminal moves between networks during an active call because of the amount of time needed to establish a new connection. On the access channel, all mobile terminals requesting to place calls share a set bandwidth, thus the mobile terminal may experience a collision with other traffic when trying to connect with the new network, which may result in the first network dropping the call before the second network can successfully pick up the call. The amount of time needed to iterate an appropriate power level may also result in the call being dropped.

Instead, the call is transferred directly from one network to another network, for example, from a 3rd Generation ("3G") Long Term Evolution ("LTE") network to a HRPD network, using only the traffic channel in order to reduce the call interruption time. However, there is currently no defined method for the mobile terminal to determine what initial open loop power level should be used on the reverse traffic channel.

Therefore, what is needed is a method and system for a mobile terminal to determine an initial open loop power for a pilot channel of the reverse traffic channel when handing-off an active phone call between networks that use different access technologies.

SUMMARY OF THE INVENTION

The present invention advantageously provides a method and system for determining an initial open loop power for a pilot channel of the reverse traffic channel when handing-off an active phone call between a primary access network and a secondary access network when the networks use different protocol technologies. Generally, the secondary access network assists the mobile terminal to determine the initial open loop power level of the reverse channel by providing an open loop adjustment factor based on the measured power level of the forward link.

One aspect of the present invention provides a method for determining an initial mean open loop power level for the pilot channel of a reverse traffic channel for a mobile terminal. The initial open loop power level enables handoff of an active call from a first access network to a second access network. A handoff initialization request is received from the first access network. A mean received power level of the forward link of the second access network is measured and transmitted to the second access network. An open loop power adjustment factor is received from the second access network. The initial mean open loop power level for the mobile terminal is set based on the open loop power adjustment factor.

In accordance with another aspect, the present invention provides a system for determining an initial mean open loop power level of a pilot channel of a reverse traffic channel for a mobile terminal. The initial open loop power level enables handoff of an active call between at least two different wireless access networks. The system comprises a first wireless access network having a first air interface standard and a second wireless access network having a second air interface standard that is different from the first air interface standard. The first access network is operable to transmit a handoff initialization request to the mobile terminal. The second access network is operable to receive a measured mean forward link power, determine an open loop power adjustment factor, and transmit the open loop power adjustment factor to the mobile terminal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
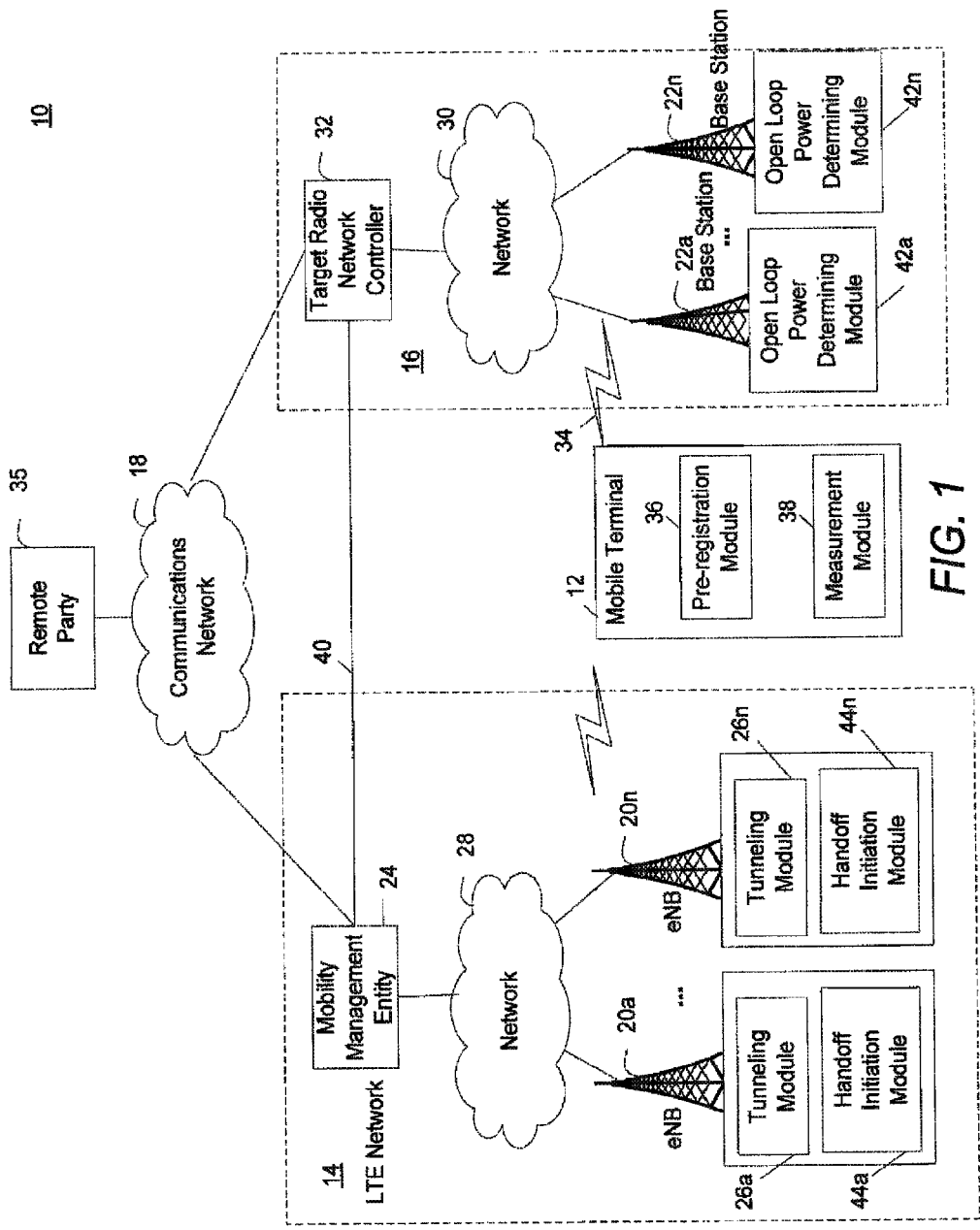
FIG. 1 is a block diagram of the network architecture of multiple wireless access networks constructed in accordance with the principles of the present invention.

Before describing in detail exemplary embodiments that are in accordance with the present invention, it is noted that the embodiments reside primarily in combinations of apparatus components and processing steps related to implementing a system and method for selectively performing time compression and/or dilation of speech signals to align a reference signal to a processed signal, in order to reduce voice quality estimation errors. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Long-term evolution ("LTE") is part of the third generation partnership project ("3GPP") and is directed to improving the universal mobile telecommunications system ("UMTS") mobile telephone standard by providing a simplified, all-packet architecture. UMTS technology supports mobile internet protocol ("IP") services, such as music downloads, video sharing, voice over IP broadband access, and other IP services to laptops, personal digital assistants ("PDAs") and other mobile terminals. LTE enhances current UMTS capabilities by providing improved efficiency, lower costs, increased peak data rates, lower latency, improved services and improved integration with other open standards.

LTE includes an evolved packet system ("EPS") architecture having an evolved packet core ("EPC") on the core side and an evolved UMTS terrestrial radio access network ("E-UTRAN") on the access side. The EPS is designed to minimize the number of signal hops that occur during signal transmission. The EPS also distributes processing loads across the network. The EPS user plane includes base station nodes and gateway nodes.

Referring now to the drawing figures in which like reference designators refer to like elements, FIG. 1 illustrates an exemplary block diagram of a system designated generally as "10" that enables mobile terminals 12 to migrate between different access networks in accordance with the principles of the present invention. The system 10 includes a first access network 14, e.g., an LTE network, a second access network 16, e.g., an EV-DO network, and a communications network 18. According to one embodiment, the invention is directed to estimating an initial open loop power level for the reverse traffic channel when moving mobile terminals 12 from the LTE network 14 to the EV-DO network 16, when the source LTE network 14 determines that the mobile terminals 12 will be better served in the EVDO network 16, such as prior to the mobile terminals 12 "falling off" the LTE network 14.

It should be appreciated that, although the invention is described with reference to the LTE network 14 and the EV-DO network 16, the principles of the invention may be adapted by one of skill in the art to migrate between any networks, including other UMTS networks, WiMAX (802.16) networks, other CDMA2000 networks and any other networks known in the art or later developed.

According to one embodiment, the mobile terminals 12 may include a wide range of portable electronic devices, including but not limited to mobile phones, personal data assistants ("PDA") and similar devices, which use the various communication technologies such as advanced mobile phone system ("AMPS"), time division multiple access ("TDMA"), code division multiple access ("CDMA"), global system for mobile communications ("GSM"), general packet radio service ("GPRS"), 1× evolution-data optimized (abbreviated as "EV-DO" or "1×EV-DO") and universal mobile telecommunications system ("UMTS"). The mobile terminals 12 also includes the hardware and software suitable to support the control plane functions needed to engage in wireless communication with eNBs 20 and base stations 22. Such hardware can include a receiver, transmitter, central processing unit, storage in the form of volatile and nonvolatile memory, and input/output devices, among other hardware.

According to one embodiment, the LTE network 14 may include a computing device arranged as a mobility management entity ("MME") 24, which is a control plane entity that manages the attachment of mobile terminals 12 to the LTE network 14, the authentication of mobile terminals 12, and may interface with a radio access network ("RAN") to create radio bearers. The MME 24 may include a central processing unit ("CPU"), communication interface, I/O devices and storage, such as volatile and nonvolatile memory, to implement the functions described herein. According to one embodiment, the MME 24 may be a signaling-only entity, such that IP data packets that originate from the mobile terminal 12 are not processed at the MME 24. The MME 24 may perform various functions, including non-access stratum ("NAS") signaling; NAS signaling security; tracking area list management for mobile terminals in idle and active mode; packet data network gateway ("PDN-GW") selection and serving gateway ("S-GW") selection; MME selection for handoffs that need MME changes; SGSN selection for handoffs to 2G or 3G 3GPP access networks; roaming; authentication; and bearer management functions; among other functions.

According to one embodiment of the invention, the LTE network 14 may include evolved Node-Bs 20a-20n (referred to collectively herein as "eNB 20") that include a server, transceivers for transmitting and receiving radio signals, and antennas. The eNB 20 may include two-way transceivers that broadcast data into the surrounding environment and typically act as mediators between wired and wireless networks. The transceivers include circuitry to transmit and receive radio signals, antennas, and equipment for encrypting and decrypting communications with the MME 24. The eNB 20 may include tunneling modules 26a-26n (referred to collectively herein as "tunneling modules 26") that communicate with components of the LTE network 14 and the EV-DO network 16 to pass signaling data between the networks. The eNB 20 may also include a CPU, I/O devices and storage, such as volatile and nonvolatile memory, to implement the functions described herein.

The eNB 20 typically performs several functions, including radio resource management, such as radio bearer control, radio admission control, connection mobility control, dynamic allocation of resources, e.g., scheduling, to mobile terminals 12 in both uplink and downlink; IP header compression and encryption of user data streams; selection of the MME 24 when the mobile terminal 12 is attached, if no MME routing is determined from information that is provided by the mobile terminal 12; scheduling and transmission of paging messages that originate from the MME 24; scheduling and transmission of broadcast information that originate from the MME 24; and measurement and measurement reporting configurations for mobility and scheduling, among performing other functions. Providing the control features in the eNB 20 reduces latency by introducing fewer hops in the media path and enabling spreading of the processing load across a plurality of eNBs 20. A network 28 may provide communications between the eNB 20 and the MME 24.

In accordance with one embodiment, the EV-DO network 16 includes base stations 22a-22n (referred to collectively herein as "base stations 22"), a communications network 30, and a Radio Network Controller ("RNC") 32. The base stations 22 may include transceivers that transmit and receive radio signals, antennas, and equipment for encrypting and decrypting communications with the RNC 32. The base stations 22 may include hardware and software that implement the functions described herein to support control plane functions. The base stations 22 may include a CPU, transmitter, receiver, and I/O devices and storage, such as volatile and nonvolatile memory, to implement the functions described herein. The base stations 22 communicate with the mobile terminal 12 over a radio interface 34. The communications network 30 supports communication between the base stations 22 and the RNC 32. According to one embodiment, the RNC 32 may include a CPU, communications interface, I/O devices and storage, such as volatile and nonvolatile memory, to implement the functions described herein. The RNC 32 controls the base stations 22 and performs various control functions such as load control, admission control, packet scheduling, handover/handoff control, macrodiversity combining, security functions, and mobility management, among performing other control functions.

According to one embodiment of the invention, the LTE network 14 is the primary network for connecting the mobile terminals 12 to one or more remote parties 35. However, when the LTE network 14 is unavailable, unreliable and/or provides inferior quality of service ("QoS"), or whenever the eNB 20 determines that an inter-technology handoff needs to be triggered, then the mobile terminals 12 may be moved to the secondary EV-DO network 14.

According to one embodiment, the mobile terminals 12 may include a pre-registration module 36 that enables pre-registration with the EV-DO network 16 while the mobile terminals 12 are in an on-going communication session with the LTE network 14. The pre-registration module 36 may facilitate pre-registration with the secondary network to minimize a total procedure time required to move the mobile terminals 12 from the primary network to the secondary network, thereby reducing the risk of service loss. An exemplary method and system for pre-registration is described U.S. patent application Ser. No. 12/052,457, filed Mar. 20, 2008, the contents of which are incorporated by reference. The mobile terminals 12 may perform a session configuration in the secondary network while actively maintaining communications in the primary network.

According to one embodiment, the mobile terminals 12 include single radio mobile terminals. The single radio mobile terminals 12 may be pre-registered with the EV-DO network 16 via the LTE air link, when the mobile terminals 12 enter an area supported by a LTE border cell. According to an alternative embodiment, the single radio mobile terminals 12 may be pre-registered with the EV-DO network 16 via the EV-DO air link when the mobile terminals 12 are switched on.

Pre-registration allows the mobile terminals 12 to establish a presence with the EV-DO network 16 in advance of a cell re-selection and/or handover/handoff procedure. The LTE network 14 may instruct the mobile terminals 12 over a broadcast channel and in a dedicated RRC message whether pre-registration is needed.

A measurement module 38 may perform radio measurements on the EV-DO network 16. The measurement module 38 may be located in the mobile terminals 12. The LTE network 14 may direct the measurement module 28 to perform the radio measurements on the EV-DO network cells. For single radio mobile terminals 12, measurement gaps may be needed to enable the mobile terminals 12 to switch to the EV-DO network 130 and perform the radio measurements.

According to one embodiment of the invention, the pre-registration signaling may include registration information, session information, and Point-to-Point Protocol ("PPP") information, among other pre-registration signaling. The pre-registration signaling may be sent transparently from the mobile terminal 12, through a corresponding eNB 20 and the MME 24, to the RNC 30 via a tunnel interface 40.

According to one embodiment of the invention, each eNB 2 of the LTE network 12 may be associated with an HRPD SectorID of the EV-DO network 16 to enable the MME 24 to select a correct radio network controller 30 for receiving the uplink tunneled messages. Associating each eNB 20 with an HRPD SectorID also provides the target RNC 30 with technology-specific measurement information, including route update and pilot strength measurements.

According to one embodiment, mobile terminal 12 may provide context information to the RNC 30, including a user profile, user history, a network location, mobile terminal location, network capabilities, network services, charging models, user settings, application settings, hardware capabilities of the mobile terminal, current required services, and radio measurement, among other mobile terminal context information. Additionally, mobile terminal context information may include terminal status information, including a battery level or an interface status, among other terminal status information. Furthermore, the mobile terminal 12 may provide network information including network status information and network load information, among other network information.

According to one embodiment, code division multiple access ("CDMA") or cdma2000 technology generates cdma2000 messages that may be tunneled to the RNC 30 from the mobile terminal 12 over the LTE network 14. The tunneled cdma2000 messages are encapsulated in the uplink information transfer and downlink information transfer Radio Resource Control ("RRC") messages. Messages that are sent through the tunnel interface 40 may include, but are not limited to, a session ID that identifies a target mobile terminal 12.

Additionally, the base stations 22 of the EV-DO network 16 include an open loop power calculating module 42 which determines an open loop power adjustment factor based on measurement parameters received from a mobile terminal 12 in a tunneled message. The open loop power adjustment factor is sent back to the mobile terminal 12 via the tunnel interface 40.

According to one embodiment of the invention, handoff initiation modules 44a-44n (referred to collectively herein as "handoff initiation modules 44") may initiate a handoff from the LTE network 14 to the EV-DO network 16 upon confirmation that the mobile terminal 12 is in an active state and is pre-registered with the EV-DO network 16. If these conditions are satisfied, and if supported by measurement reports received from the measurement module 38 of the mobile terminals 12, then the handoff initiation modules 44 may initiate the handoff by sending an RRC message to the mobile terminals 12 requesting the handoff to occur. The RRC message may include the specified target type and any cdma2000 specific HRPD parameters that are needed by the mobile terminals 12 to create the HRPD messages needed to request a connection.

According to one embodiment of the invention, the mobile terminals 12 may continue to send and receive data on the LTE network 14 until receipt of a "handoff command". After receiving the "handoff command" at the mobile terminal 12, the mobile terminal 12 terminates communication with the LTE network 14 and starts acquiring the HRPD traffic channel. The HRPD handoff signaling is tunneled between the mobile terminals 12 and the EV-DO network 16 via the corresponding eNB 20 and the MME 24.

Figure 2:
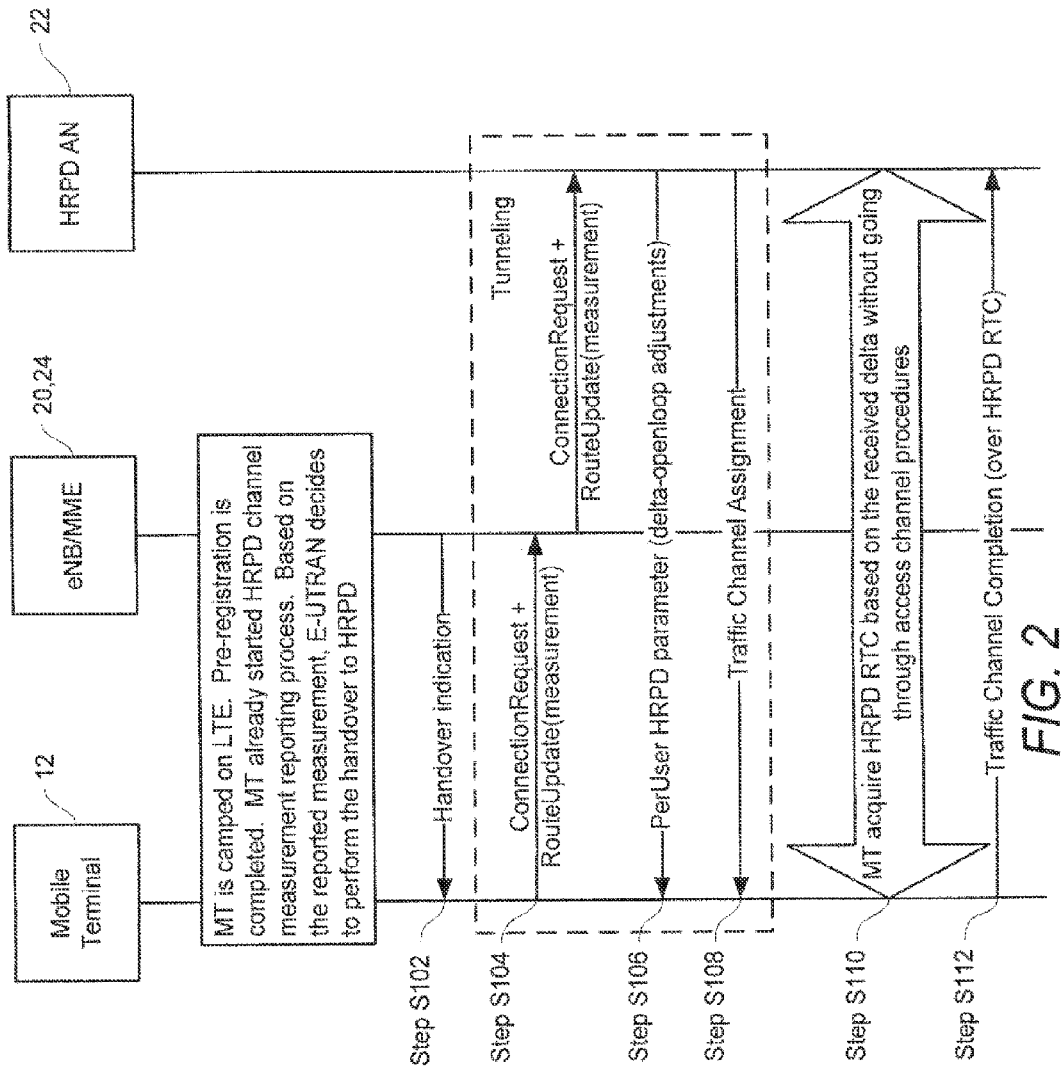
FIG. 2 is a flow diagram of a service flow performed in accordance with the principles of the present invention for registering a mobile terminal in a secondary access network while the mobile terminal is actively communicating with the primary access network.

An exemplary open loop power determination process of the mobile terminal 12 on the EV-DO network 130 is discussed with reference to FIG. 2. The mobile terminal 12, operating in an active state, may determine an initial open loop power for operating on the reverse traffic channel based on information provided by the EV-DO base station 22 as part of the handoff process. For example, the mobile terminal 12 may be entering into a region supported by a LTE border cell which has determined that a handoff to an EV-DO network 16 is needed to continue conducting the call. As part of the handoff process, the mobile terminal 12 conducts a pre-registration procedure prior to initiating the handoff and begins conducting and reporting measurements of the HRPD forward channel pilot power of the EV-DO network 14 to which the call will be transferred. Based on the HRPD measurements, the current or "serving" eNB 20 decides to perform a handoff to the EV-DO network 16.

At step S102, the serving eNB 20 sends a handoff initiation indication to the mobile terminal 12. In response, the mobile terminal 12 may route the HRPD measurements, as measured by the measurement module 38, to the target RNC 32 in the EV-DO network 16 via the corresponding eNB 20 and the MME 24 (step S104). The HRPD measurements may be included in a ConnectionRequest+RouteUpdateMeasurement message. According to one embodiment, the mobile terminal 12 may include a single radio that communicates with the target RNC 32 of the EV-DO network 16 by passing the EV-DO signal transparently through the eNB 20 and the MME 24. This operation may be performed by encapsulating the EV-DO signal in LTE radio signaling protocols, such as NAS signaling, for example. The encapsulated EV-DO signal may be tunneled, via tunneling interface 40, from the MME 24 to the RNC 32 without requiring the LTE network 14 to read and/or understand the EV-DO signaling. The tunneling interface 40 provides bi-directional communication between the LTE network 14 and the EV-DO network 16.

After receiving the HRPD measurements, the target RNC 32 allocates resources of a target base station 22 needed to continue the call and assists the mobile terminal 12 with determining an initial open loop power level for the reverse traffic channel sufficient to successfully communicate with the target BTS 20. The open loop RTC power module 42 of the target BTS 22 determines an open loop power adjustment factor containing power level delta that sets the open loop power level of the mobile terminal 12 to a point that will allow the mobile terminal 12 to successfully perform the handoff.

It is contemplated that the open loop power adjustment factor may be calculated in one of two ways. For the case where the mobile terminal 12 has stored the reverse channel transmission power and the forward link power of the last successful transmission to the EV-DO network 16, the open loop adjustment factor should be set to the value where the initial mean output power of the pilot channel of the RTC equals the mean output power of the pilot channel at the end of the last RTC transmission+the difference in the forward link mean received signal power from the end of the last RTC transmission to the start of the RTC transmission+the open loop power adjustment factor.

If the mobile terminal 12 does not store the power level parameters relating to the last successful transmission, then the initial mean output power of the pilot channel of the RTC equals the initial power level−the forward link mean received signal power+the open loop adjustment factor. In this case, both the initial power setting and the open loop adjustment factor are supplied by the target RNC 32. The initial power level and the open loop power level adjustment factor may be combined into one parameter. Separating these factors allows a default number to be set for the "initial power level" and only the open loop power adjustment factor may be used to adjust for each handover. Thus, the initial power level factor may be omitted if not needed. Of course, other methods for calculating the open loop power adjustment factor may be used and the present invention is not limited to the two exemplary methods described herein.

The adjustment factors may be included in any tunneled handoff related message from the target network 16 to the mobile terminal 12. For example, the open loop power estimation parameters may be carried by a unicast message, such as "PerUserHRPDParameters," and tunneled to the mobile terminal 12 (step S106) just before the traffic channel is assigned (step S108).

The mobile terminal 12 uses the open loop adjustment parameters to set the initial open loop pilot power for the reverse channel (step S110) without going through access channel procedures and the call continues on the traffic channel of the target network 16 (step S112). After initial acquisition, the reverse channel transmission power may be adjusted using known techniques.

Optionally, after receiving the open loop power adjustments parameters and switching to the target network, the mobile terminal 12 may conduct a "RTC initialization period" wherein the mobile terminal 12 does not transmit data for a pre-determined amount of time. Instead, the mobile terminal 12 listens to the forward link of the target network to obtain Power Control information and uses the information to adjust the pilot power level to a level that minimizes interference before transmitting data.

Figure 3:
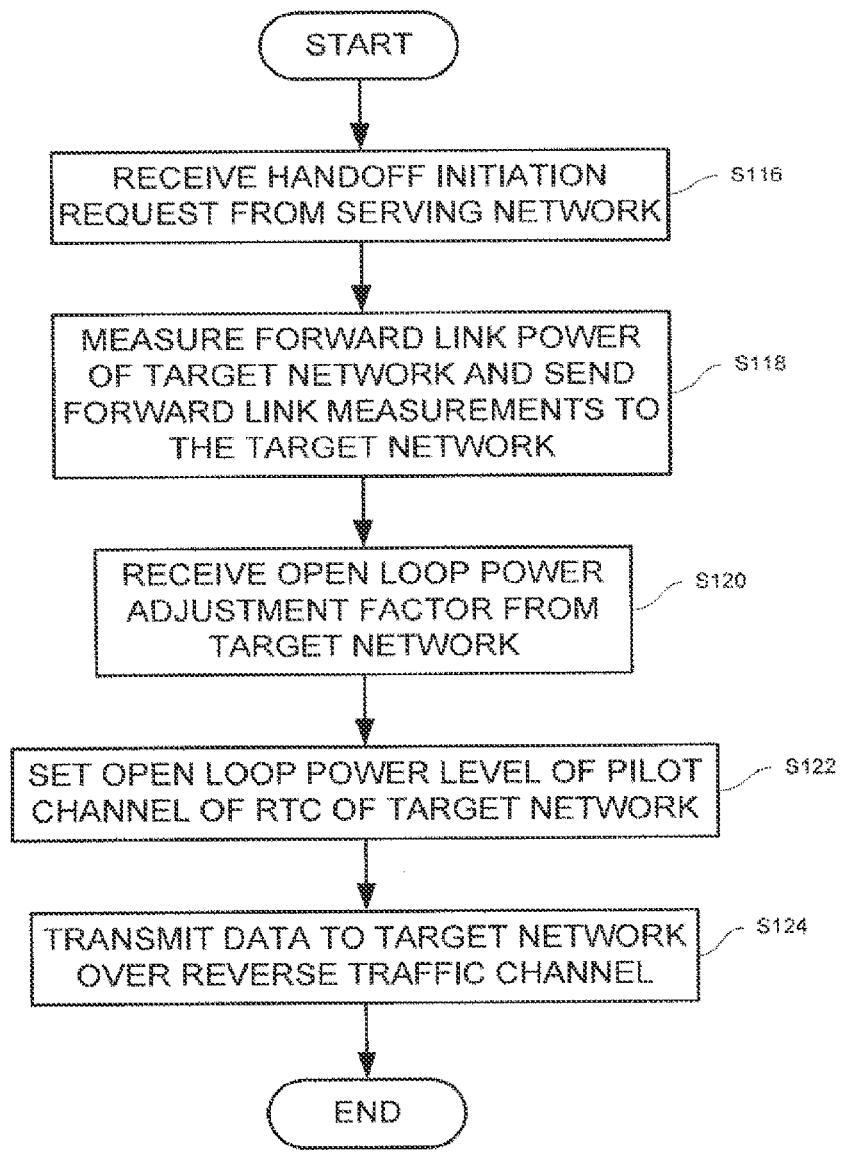
FIG. 3 is a flowchart of an exemplary initial open loop power estimation process performed in accordance with the principles of the present invention for a mobile terminal during handoff between a primary access network and a secondary access network.

FIG. 3 provides an exemplary operational flowchart that describes steps generally performed by a mobile terminal to determine an initial open loop power for the reverse channel when conducting a handoff to a network using a different technology while the mobile terminal is engaged in an active call. The mobile terminal receives a handoff initiation request from the serving network (step S116). The mobile terminal measures the received forward link power of the target network and sends the forward link measurements to the target network (step S118). The forward link measurements may be sent to the target network via a tunneling interface between the serving network and the target network. The mobile terminal receives open loop power adjustment parameters from the target network based on the measured forward link power (step S120).

It should be noted that determining the open loop power adjustment factor based on the forward link power measured by the mobile terminal is just one method that the target network may use to determine the open loop power adjustment factor. There are other ways for the target network to determine the factor wherein the forward link power measurement reported by the mobile terminal is simply used to determine whether the mobile terminal should be handed over to the target network, and the open loop power adjustment factor is determined by some other predefined method. For example, the "factor" value can be based upon the previous experience of the deployed network.

The mobile terminal uses the open loop power adjustment parameters to set the open loop power level of the pilot of the reverse traffic channel (step S122). The mobile terminal continues the active call over the target network by sending data to the target network over the reverse traffic channel using the open loop power level of the pilot channel determined with assistance from the target network (step S124).

Embodiments of the present invention advantageously provide a method of determining the initial open loop power level for the reverse traffic channel when an active call is being handed off between networks that operate using different technologies by allowing the target network to assist in the determination of the power level needed to successfully conduct the call. The present invention does not require use of the access channel to establish communication with the target network, thereby reducing the amount of time it takes to handoff a call and improving the likelihood of a successful transfer.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for determining an initial mean open loop power level of a pilot channel of a reverse traffic channel for a mobile terminal, the initial open loop power level enabling handoff of an active call from a first access network to a second access network, the method comprising:
   receiving a handoff initialization request from the first access network;
   measuring a mean received power level of the forward link of the second access network, wherein the second access network and the first access network comprise different radio access technologies (RATs);
   transmitting the measured mean forward link power to the second access network;
   receiving an open loop power adjustment factor from the second access network; and
   setting the initial mean open loop power level based on the open loop power adjustment factor.

2. The method of claim 1, wherein the open loop power adjustment factor is based on the measured mean forward link power.

3. The method of claim 1, wherein the initial mean open loop power level is further based on a mean output power of a pilot channel at termination of a prior reverse traffic channel transmission and a difference between a mean forward link power at termination of the prior reverse traffic channel transmission and the measured mean forward link power.

4. The method of claim 1, wherein the initial mean open loop power level is further based on an initial power level less the measured mean forward link power.

5. The method of claim 4, wherein the initial power level is received from the second access network.

6. The method of claim 4, wherein the mobile terminal includes a memory, the initial power level being stored in the memory.

7. The method of claim 1, wherein the measured mean forward link power is transmitted to the second access network through a tunneling interface.

8. The method of claim 1, wherein the first access network comprises Long Term Evolution and the second access network comprises CDMA2000.

9. The method of claim 1, further comprising transmitting data to the second access network using the reverse traffic channel.

10. The method of claim 1, further comprising preventing transmission of data to the second access network on the reverse traffic channel for a pre-determined delay time, the pre-determined delay time being sufficient to permit the second access network and the mobile terminal to adjust the power level of the reverse traffic channel.

11. A system for determining an initial mean open loop power level of a pilot channel of a reverse traffic channel for a mobile terminal, the initial open loop power level enabling handoff of an active call between at least two different wireless access networks, the system comprising:
   a first wireless access network comprising a first radio access technology (RAT), the first wireless access network operable to transmit a handoff initialization request to the mobile terminal, wherein the handoff initialization request instructs the mobile terminal to handoff from the first wireless access network to a second wireless access network; and
   the second wireless access network having comprising a second RAT, wherein the second RAT is different than the first RAT, the second wireless access network operable to:
   receive a measured mean forward link power of the second wireless access network; determine an open loop power adjustment factor; and transmit the open loop power adjustment factor to the mobile terminal.

12. The system of claim 11, wherein the mobile terminal is operable to set the initial mean open loop power level based on the open loop power adjustment factor.

13. The system of claim 12, wherein the initial mean open loop power level is further based on a mean output power of a pilot channel at termination of a prior reverse traffic channel transmission, and a difference between a mean forward link power at termination of the prior reverse traffic channel transmission and the measured mean forward link power.

14. The system of claim 12, wherein the initial mean open loop power level is further based on an initial power level less the measured mean forward link power.

15. The system of claim 14, wherein second wireless access network is further operable to transmit the initial power level.

16. The system of claim 14, wherein the mobile terminal includes a memory, the initial power level being stored in the memory.

17. The system of claim 11, wherein first wireless access network further includes a tunneling module, the first wireless access network is further operable to transmit the measured mean forward link power to the second wireless access network through a tunneling interface.

18. The system of claim 11, wherein the first wireless access network comprises Long Term Evolution and the second wireless access network comprises CDMA2000.

19. The system of claim 11, wherein the mobile terminal is further operable to transmit data to the second wireless access network using the reverse traffic channel.

20. The system of claim 11, wherein the mobile terminal is further operable to prevent transmission of data to the second wireless access network on the reverse traffic channel for a pre-determined delay time, the pre-determined delay time being sufficient to permit the second wireless access network and the mobile terminal to adjust the power level of the reverse traffic channel.

* * * * *

UNITED STATES PATENT AND TRADEMARK OFFICE
CERTIFICATE OF CORRECTION

PATENT NO.       : 8,780,865 B2                           Page 1 of 1
APPLICATION NO.  : 13/616612
DATED            : July 15, 2014
INVENTOR(S)      : Ke-chi Jang, Larry T. Bolen and Jun Li It is certified that error appears in the above-identified patent and that said Letters Patent is hereby corrected as shown below:

In the Claims

Column 11, Line 31, Claim 11, delete "network having" and insert -- network --, therefor.

Signed and Sealed this
Twenty-first Day of October, 2014

Michelle K. Lee
*Deputy Director of the United States Patent and Trademark Office*